(12) United States Patent
Foi et al.

(10) Patent No.: US 7,652,788 B2
(45) Date of Patent: Jan. 26, 2010

(54) APPARATUS, METHOD, MOBILE STATION AND COMPUTER PROGRAM PRODUCT FOR NOISE ESTIMATION, MODELING AND FILTERING OF A DIGITAL IMAGE

(75) Inventors: Alessandro Foi, Tampere (FI); Vladimir Katkovnik, Tampere (FI); Dmitriy Paliy, Tampere (FI); Karen Egiazarian, Tampere (FI); Mejdi Trimeche, Tampere (FI); Sakari Alenius, Lempäälä (FI); Radu Bilcu, Tampere (FI); Markku Vehvilainen, Tampere (FI)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 11/519,722

(22) Filed: Sep. 11, 2006

(65) Prior Publication Data
US 2007/0297019 A1 Dec. 27, 2007

Related U.S. Application Data

(63) Continuation-in-part of application No. 11/426,128, filed on Jun. 23, 2006, now abandoned.

(51) Int. Cl.
*H04N 1/409* (2006.01)
*H04N 1/58* (2006.01)
*G06T 5/50* (2006.01)
*G06K 9/40* (2006.01)

(52) U.S. Cl. .................... 358/1.6; 358/3.26; 358/406; 358/463; 358/504; 382/261; 382/275

(58) Field of Classification Search .................. 358/1.6, 358/1.9, 3.01, 3.26, 3.27, 406, 463, 461, 358/482, 483, 504, 518, 521, 532; 382/254, 382/260, 261, 264, 274, 275; 348/241, 248–251
See application file for complete search history.

(56) References Cited

U.S. PATENT DOCUMENTS

| | | | | |
|---|---|---|---|---|
| 6,606,172 B1 * | 8/2003 | Moro | ......................... | 358/406 |
| 6,822,657 B2 * | 11/2004 | Baer | ......................... | 358/504 |
| 6,891,977 B2 * | 5/2005 | Gallagher | .................... | 382/254 |
| 6,937,775 B2 * | 8/2005 | Gindele et al. | .............. | 382/254 |
| 6,965,702 B2 * | 11/2005 | Gallagher | .................... | 382/275 |
| 7,062,108 B2 * | 6/2006 | Gallagher et al. | ........... | 382/254 |

(Continued)

OTHER PUBLICATIONS

Foi, R. Bilcu, V. Katkovnik, & K. Egiazarian, "Anisotropic local approximations for pointwise adaptive signal-dependent noise removal," in Proc. XIII European Signal Proc. Conf., EUSIPCO 2005, Sep. 2005, pp. 1-4.

(Continued)

*Primary Examiner*—Scott A Rogers
(74) *Attorney, Agent, or Firm*—Alston & Bird LLP

(57) ABSTRACT

An apparatus, method, mobile station and computer program product are provided for filtering noise from a digital signal. In particular, a signal-dependent noise model is used that provides the pointwise (or pixelwise) standard deviation of the temporal noise of raw data outputted from a digital imaging sensor as a function of the image intensity. In addition, unlike conventional noise models, the standard deviation of the noise ($\sigma$) is a parameterized function, where the parameters are key characteristics of the digital imaging sensor. These parameters may include, for example, the pedestal level (p), the quantum efficiency (q), and the analogue gain ($\alpha$) associated with the digital imaging sensor.

45 Claims, 14 Drawing Sheets

U.S. PATENT DOCUMENTS

2006/0050980 A1* 3/2006 Kohashi .................. 382/254
2007/0009175 A1* 1/2007 Lim et al. ................ 382/275
2008/0095431 A1* 4/2008 Ishiga .................... 382/274

OTHER PUBLICATIONS

A. Foi, S. Alenius, M. Trimeche, V. Katkovnik, K. Egiazarian, "A spatially adaptive Poissonian image deblurring," in Proc. IEEE 2005 Int. Conf. Image Processing, ICIP 2005, Sep. 2005, pp. 1-4.

R. Costantini & S. Süsstrunk, "Virtual Sensor Design," Proc. IS&T/SPIE Electronic Imaging 2004: Sensors and Camera Systems for Scientific, Industrial, and Digital Photography Applications V, 2004, vol. 5301, pp. 408-419.

H. Tian, B. Fowler, & A. El Gamai, "Analysis of Temporal Noise in CMOS Photodiode Active Pixel Sensor," IEEE Journal of Solid-State Circuits, vol. 36, No. 1, pp. 92-101, Jan. 2001, pp. 1-10.

D. Joseph & S. Collins, "Modeling, Calibration and Rendition of Color Logarithmic CMOS Image Sensors," IEEE Transactions on Instrumentation and Measurements, vol. 52, No. 5, pp. 1581-1587, Oct. 2003.

H. Wach & E.R. Dowski, Jr., "Noise modeling for design and simulation of computational imaging systems," Proceedings of SPIE—vol. 5438 Visual Information Processing XIII, Zia-ur Rahman, Robert A. Schowengerdt, Stephen E. Reichenbach, Editors, Jul. 2004, pp. 159-170.

A.J. Blanksby & M.J. Loinaz, "Performances analysis of a color CMOS photogate sensor," IEEE Trans. Electron Devices, vol. 47, No. 1, pp. 55-64, Jan. 2000.

ISO 15739, "Photography—Electronic still-picture imaging—Noise measurements," (2003), pp. 1-34.

Hytti, H., "Characterization of digital image noise properties based on RAW data," Proceedings of SPIE—vol. 6059, Image Quality and System Performance III, Luke C. Cui, Yoichi Miyake, Editors, 60590A Jan. 15, 2006, pp. 1-13.

* cited by examiner

APPARATUS, METHOD, MOBILE STATION AND COMPUTER PROGRAM PRODUCT FOR NOISE ESTIMATION, MODELING AND FILTERING OF A DIGITAL IMAGE

CROSS-REFERENCE TO RELATED APPLICATIONS

This application is a continuation-in-part of U.S. patent application Ser. No. 11/426,128, filed Jun. 23, 2006, now abandoned which is hereby incorporated herein in its entirety by reference.

FIELD

Exemplary embodiments of the present invention relate, generally, to digital image processing and, in particular, to digital imaging sensor noise modeling.

BACKGROUND

Progress in digital imaging hardware design has introduced digital imaging sensors having a dramatically increased number of pixels, or pixel density (i.e., having an increase in the sensor's resolution). While beneficial for many reasons, this results in the size of each pixel becoming smaller and smaller and, therefore, the sensor output signal's susceptibility to noise becoming greater and greater.

In order to attenuate the noise in the most efficient way, it is important that proper modeling of the noise is considered during digital image processing. However, modeling of noise can be difficult since, when utilizing, for example, a digital camera, the images are likely taken under different illumination conditions and different ambient temperatures. In addition, the digital imaging sensor itself may apply different exposure and/or analogue gain settings, or the like. In other words, the noise that results from digital sensing can vary from image to image. Because of inherent photoelectric conversion, the noise is predominantly signal-dependent. A single non-adaptive image processing filter may, therefore, not be useful for all pictures taken under these varying conditions.

Despite this, current filtering algorithms typically assume independent stationary noise models (i.e., signal-independent), and even where a signal-dependent model is assumed, the correct parameters for the noise are often not specified.

Recently, several complete models have been proposed, which explicitly take into account most of the elements that can potentially contribute to the sensor's noise (e.g., dark signal level, Fixed-Pattern Noise, Shot-noise Photonic (Poissonian noise), dark current noise, dark current non-uniformity, photo-response non-uniformity, amplifier noise, circuit noise, thermal noise, pixel cross-talk, correlated double sampling, quantization noise, chromatic conversions, etc.). (See R. Costantini and S. Süsstrunk, "Virtual Sensor Design", Proc. IS&T/SPIE Electronic Imaging 2004: Sensors and Camera Systems for Scientific, Industrial, and Digital Photography Applications V, 2004, Vol. 5301, pp. 408-419; H. Wach and E. R. Dowski, Jr., "Noise modeling for design and simulation of computational imaging systems", Proceedings of SPIE—Volume 5438 Visual Information Processing XIII, Zia-ur Rahman, Robert A. Schowengerdt, Stephen E. Reichenbach, Editors, July 2004, pp. 159-170 (referred to hereinafter as "Wach"); and A. J. Blanksby and M. J. Loinaz, "Performance analysis of a color CMOS photogate sensor," IEEE Trans. Electron Devices, vol. 47, no. 1, pp. 55-64, January 2000). While these proposed models provide an accurate modeling of each individual contributor to the noise, the large number of parameters contemplated by these complex models makes them eventually unpractical for modeling the overall sensor's noise. Some of the model parameters may implicitly depend on other parameters (posing serious limitations to their estimation, as it is often not possible to estimate many parameters simultaneously with sufficient precision), and some may belong to the inner-workings of the sensor itself and, therefore, may not be known by other than the sensor's manufacturer. In practice, it is thus arguably impossible to achieve any faithful approximation of the overall sensor's noise by means of these much-articulated models. Further, these models treat color channels separately, obtaining different noise parameters for different channels.

In addition, most research literature available on sensor noise analysis was developed within the electronic engineering community and typically comes to conclusions and models which are useful and significant mainly for the purpose of electronic hardware design and integration (e.g., dimensioning of the device, interfacing, shielding, etc.). (See H. Tian, B. Fowler, and A. El Gamal, "Analysis of Temporal Noise in CMOS Photodiode Active Pixel Sensor," IEEE Journal of Solid-State Circuits, vol. 36, no. 1, pp. 92-101, January 2001). The literature provides results that are of a global nature (i.e., provides noise figures which are valid and accurate for the whole sensor). However, such global noise estimates are rough when applied to an individual pixel of the sensor. These models, therefore, are inadequate for high-quality image processing applications, such as de-noising or de-blurring, since these techniques require accurate pointwise (i.e., pixelwise) knowledge of the noise, in order to properly restore the image details.

A need, therefore, exists for a more accurate and usable noise model that can be placed in the imaging chain for use in de-noising, de-blurring, and other digital image processing tasks (e.g., color interpolation, sharpening, etc.).

BRIEF SUMMARY

In general, exemplary embodiments of the present invention provide an improvement over the known prior art by, among other things, providing a signal-dependent noise model that provides the pointwise (or pixelwise) standard deviation of the temporal noise of raw data outputted from a digital imaging sensor as a function of the image intensity. In one exemplary embodiment, the standard deviation of the noise ($\sigma$) is a parameterized function, where the parameters are key characteristics of the digital imaging sensor. These parameters may include, for example, the pedestal level (p), the quantum efficiency (q), and the analogue gain ($\alpha$) associated with the digital imaging sensor.

In accordance with one aspect, an apparatus is provided. In one exemplary embodiment, the apparatus comprises: (1) an input for receiving data representative of an intensity of an image at a pixel position; (2) a processing element for filtering the data to remove noise, wherein the processing element filters the data based on at least one parameter associated with one or more characteristics of a sensor through which the image was captured; and (3) an output for providing the filtered data.

In one exemplary embodiment the processing element filters the data based on a signal-dependent noise model defined based on the at least one parameter associated with one or more characteristics of the sensor. In another exemplary embodiment, the processing element determines a standard deviation of the noise as a function of the intensity of the image at the pixel position. This may include, for example, determining the standard deviation based on at least one of a quantum efficiency (q), a pedestal level (p), or an analogue gain (α) associated with the sensor. In particular, in one exemplary embodiment, the standard deviation is determined in accordance with $$\sigma^{[\alpha]}(y) = \alpha q \sqrt{\frac{y-p}{\alpha}} = q\sqrt{\alpha(y-p)},$$

wherein y represents the intensity of the image at the pixel position.

In accordance with another aspect, a method is provided of filtering noise from a digital image. In one exemplary embodiment, the method includes: (1) receiving data representative of an intensity of an image at a pixel position; (2) filtering the data to remove noise, wherein the processing element filters the data based on at least one parameter associated with one or more characteristics of a sensor through which the image was captured; and (3) providing the filtered data.

According to one aspect, a mobile station is provided for filtering noise from a digital image. In one exemplary embodiment the mobile station includes a processor and a memory in communication with the processor that stores an application executable by the processor, wherein the application is configured, upon execution, to: (1) receive data representative of an intensity of an image at a pixel position; (2) filter the data to remove noise, wherein the processing element filters the data based on at least one parameter associated with one or more characteristics of a sensor through which the image was captured; and (3) provide the filtered data.

According to another aspect an apparatus is provided that, in one embodiment, includes: (1) means for receiving data representative of an intensity of an image at a pixel position; (2) means for filtering the data to remove noise, wherein the processing element filters the data based on at least one parameter associated with one or more characteristics of a sensor through which the image was captured; and (3) means for providing the filtered data.

In accordance with yet another aspect, a computer program product is provided for filtering noise from a digital image. The computer program product contains at least one computer-readable storage medium having computer-readable program code portions stored therein. The computer-readable program code portions of one exemplary embodiment include: (1) a first executable portion for receiving data representative of an intensity of an image at a pixel position; (2) a second executable portion for filtering the data to remove noise, wherein the processing element filters the data based on at least one parameter associated with one or more characteristics of a sensor through which the image was captured; and (3) a third executable portion for providing the filtered data.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Figure 1:
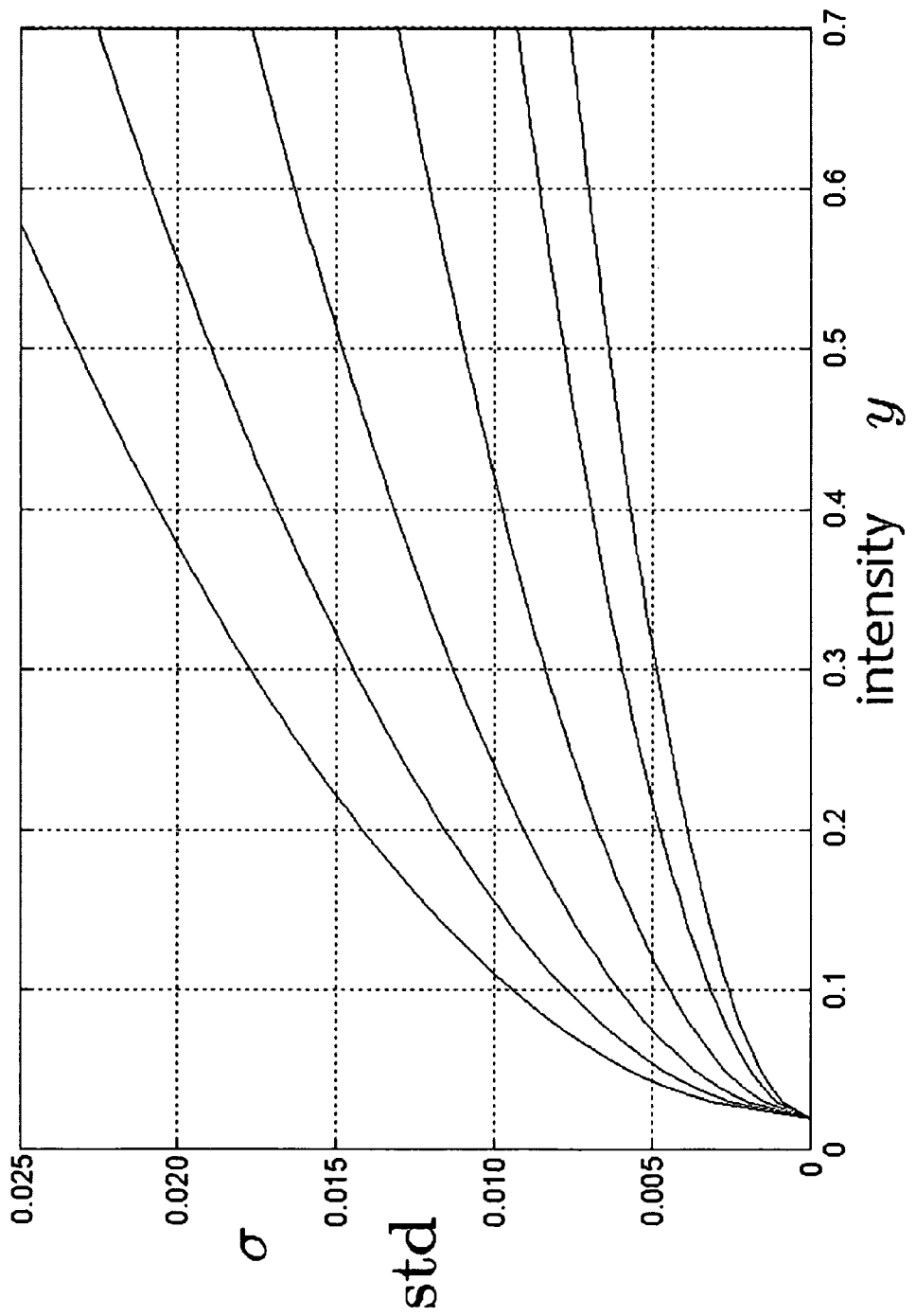
FIG. 1 represents a family of standard deviation curves that can be derived for different analogue gain values in accordance with exemplary embodiments of the present invention.

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a signal-dependent noise model for raw data of a digital imaging sensor (e.g., a Complementary Metal-Oxide Semiconductor (CMOS) or Charge-Coupled Device (CCD) sensor), which can be plugged into a corresponding generic image processing filter of an imaging device (e.g., a digital camera, cameraphone, webcam, etc.) in order to optimize the final imaging quality. Exemplary embodiments further provide a calibration methodology that can be used to estimate the parameters of the noise model.

In particular, the noise model of exemplary embodiments provides the pointwise (or pixelwise) standard deviation of the temporal noise of the raw data as a function of the image intensity. In other words, every pixel of the image is considered with an individual estimate of its variance.

As a consequence of this modeling, the standard deviation versus intensity curve does not depend on the color-channel or exposure time associated with the signal at an individual pixel position. This is a remarkable difference from conventional noise models for imaging sensors, in which the level of noise depends on the color-channel and the exposure time, resulting in conventional noise models being difficult to use in practical implementation, since they require that the de-noising algorithm be aware of both the color-channel and exposure settings.

The signal-dependent noise model of exemplary embodiments of the present invention can be described by three parameters, which are sensor-dependent and can be identified easily at the manufacturing stage. These parameters are further capable of being adjusted later (i.e., to calibrate or recalibrate the sensor).

Implementation of the noise model of exemplary embodiments within the imaging chain allows the performance of accurate digital filtering of the raw data, and, in particular, de-noising and de-blurring by using algorithms suitable for signal-dependent noise.

Theoretical Modeling of Noise:

The following illustrates how the noise model of exemplary embodiments of the present invention can be derived.

First observe the generic noise model of the form:

$$z(x)=y(x)+\sigma(y(x))\xi(x) \quad \text{Equation 1}$$

where x is the pixel position, y is the intensity of the original image, $\xi$ is a random noise element with a standard deviation equal to 1, and $\sigma$, which is a function of the intensity (i.e., of y), modulates the standard deviation of the overall noise component. The random noise $\xi(x)$ is zero-mean, hence $E\{z(x)\}=y(x)$. Therefore, $std[z(x)]=\sigma(E\{z(x)\})$, where std stands for the standard deviation. No other restriction is placed on the distribution of $\xi(x)$, and different pixels may have different distributions.

Let z(x) be the Poisson process. Conceptually, this stochastic model corresponds to the counting process of the photons that fall on the small photo-sensitive pixel area. The standard "ideal" model for the Poissonian observations implies that the variance is equal to the mean:

$$var\{z(x)\}=E\{z(x)\} \quad \text{Equation 2}$$

Thus, Equation 1 takes the form:

$$z(x)=y(x)+\sqrt{y(x)}\xi(x) \quad \text{Equation 3}$$

The proposed approximate Poissonian model is modified essentially, with respect to Equation 3, by introducing three parameters, which relate to specific aspects of the digital sensor's hardware. These parameters, which are discussed in more detail below, include: quantum efficiency, pedestal level and analogue gain. The result of introducing these parameters into the noise model is a link between the expectation and the variance that is different from that of the ideal model (i.e., Equation 3).

Scale Parameter: Incorporating the Quantum Efficiency (q):

In practice, acquisition systems do not have an ideal response to the collected photons, and, typically, a large number of photons are used to produce a response of the sensor. This means that, with respect to the ideal case, the intensity of the photon flow is reduced by a scalar factor. The impact of this factor on the observation model is expressed by a coefficient q appearing as a multiplier in front of the noise term:

$$z(x)=y(x)+q\sqrt{y(x)}\xi(x)$$

$$\sigma(y)=q\sqrt{y} \quad \text{Equation 4}$$

The value of q affects the intensity-dependent signal-to-noise ratio (SNR) of the imaging sensor, $$SNR(y) = \frac{y}{\sigma(y)} = \frac{\sqrt{y}}{q} \quad \text{Equation 5}$$

The coefficient q is related to the so-called quantum efficiency of the sensor's pixel, i.e., the charge-photons ratio, and larger values of q correspond to a lower (or worse) signal-to-noise ratio.

Pedestal Parameter (p):

In digital imaging sensors, the collected charge always starts from some small base, or "pedestal" level. This constitutes an offset-from-zero of the recorded data:

$$z(x)=z_0(x)+p \quad \text{Equation 6}$$

Here z is the raw data, $z_o$ is the collected charge and p is the pedestal level. The pedestal level is typically subtracted from the raw data after processing, in order to improve the image contrast.

The pedestal does not affect the standard deviation, but only relates to a shift in the intensities. It then follows that Equation 4 is transformed into:

$$z(x)=y_0(x)+p+q\sqrt{y_0(x)}\xi(x) \quad \text{Equation 7}$$

where $y_0=E\{z_0\}$ is the signal of interest, and $y(x)=y_0(x)+p=E\{z(x)\}$ is the expectation of the raw data. In terms of the raw data and its expectation only, Equation 7 can be rewritten as:

$$z(x)=y(x)+q\sqrt{y(x)-p}\xi(x) \quad \text{(x) Equation 8}$$

and, thus, the standard deviation of z(x) is:

$$\sigma(y)=q\sqrt{y-p} \quad \text{Equation 9}$$

Note that, according to the Poissonian modeling, aspects, such as the exposure-time or the wavelength of the light, do not appear in the above equations. However, they are implicitly, or more precisely, automatically, taken into account. For example, increasing the exposure time causes the number of collected photons to increase proportionally resulting in an increased in the intensity of the recorded data. Consequently, the SNR also increases. In a similar fashion, different color filters allow different proportions of the incoming photons to pass towards the sensor, depending upon the wavelength of the light. This causes a decrease in the number of collected photons, and consequently a lowering of the SNR, when the intensity of the considered color band is lower (e.g., blue channel typically has a lower SNR).

Analogue Gain Parameter ($\alpha$):

The above model applies to any raw data taken without analogue gain (i.e., 0 dB). Analogue gain is then modeled as an amplification of the collected charge. In other words, the collected charge (i.e., roughly speaking, the number of collected photons) is multiplied by a gain parameter $\alpha>1$ prior to being read out of the sensor. This requires that a clear distinction be made between what is the collected charge and what is the raw data, which is read from the sensor.

Where $z_0$ denotes the collected charge, $z^{[\alpha]}$ denotes the raw data corresponding to a gain parameter $\alpha$. For no gain, $\alpha=1$ and $$z^{[1]}(x)=z_0(x)+p \quad \text{Equation 10}$$

while, for a generic $\alpha$:

$$z^{[\alpha]}(x)=\alpha z_0(x)+p=\alpha(z^{[1]}(x)-p)+p \quad \text{Equation 11}$$

In the previous section, the model Equation 9 was derived, which gives the standard deviation $std\{z^{[1]}\}$ of the raw data $z^{[1]}$ as a function $\alpha^{[1]}$ of its expectation $E\{z^{[1]}\}$, $$std\{z^{[1]}(x)\}=\sigma^{[1]}(E\{z^{[1]}(x)\})=q\sqrt{E\{z^{[1]}(x)\}-p} \quad \text{Equation 12}$$

Now, a similar function $\sigma^{[\alpha]}$ should be found, such that $$std\{z^{[\alpha]}(x)\}=\sigma^{[\alpha]}(E\{z^{[\alpha]}(x)\}) \quad \text{Equation 13}$$

By considering the impact of the addition of a scalar, or multiplication by a scalar, on the standard deviation of the random variable, one can obtain:

$$\text{std}\{z^{[\alpha]}(x)\}=\text{std}\{\alpha(z^{[1]}(x)-p)+p\}=\alpha\cdot\text{std}\{z^{[1]}(x)\}= \alpha\cdot\sigma^{[1]}(E\{z^{[1]}(x)\}) \quad \text{Equation 14}$$

Since $$z^{[1]} = \frac{z^{[\alpha]} - p}{\alpha} + p \quad \text{Equation 15}$$

one arrives to the general form of $\sigma^{[\alpha]}$ with respect to $\sigma^{[1]}$:

$$\text{std}\{z^{[\alpha]}(x)\} = \alpha\cdot\sigma^{[1]}\left(\frac{E\{z^{[\alpha]}(x)\} - p}{\alpha} + p\right) = \sigma^{[\alpha]}(E\{z^{[\alpha]}\}) \quad \text{Equation 16}$$

Final Result:
By recalling Equation 9, one can formulate the final result:

$$\sigma^{[\alpha]}(y) = \alpha q \sqrt{\frac{y - p}{\alpha}} = q\sqrt{\alpha(y - p)} \quad \text{Equation 17}$$

which provides the standard deviation $\text{std}\{z[\alpha]\}$ of the raw data $z[\alpha]$ as a function of its expectation $E\{z[\alpha]\}$. The parameter $\alpha$ is defined by the used gain. By varying the parameter $\alpha$, Equation 17 yields the family of curves illustrated in FIG. 1. In particular, FIG. 1 represents the family $\sigma^{[\alpha]}(y)=q\sqrt{\alpha(y-p)}$ for certain choices of $\alpha \geq 1$, where p and q are fixed values corresponding to the noise model of a particular CMOS sensor from a Nokia cameraphone. Observe from FIG. 1 that increasing a results in a higher curve representing a decrease of the SNR understood as $$\frac{y}{\sigma^{[\alpha]}(y)}.$$

Calibration Methodology for Estimation of Model Parameters:

The following illustrates how the parameters p and q (i.e., pedestal level and quantum efficiency), which depend on the particular digital sensor in use, can be determined and further how the noise model derived above can be validated.

The following assumes that a sufficient number N of shots of a fixed target has been taken under constant-in-time illumination. There are no particular requirements of the target (even though in practice it would be beneficial if the target exhibited portions of different brightness/darkness, so as to cover a wide range of intensities), thus enabling a generic fixed target image to be used. Observe that this constitutes a fundamental difference from previously published procedures (See e.g., ISO 15739, "Photography—Electronic still-picture imaging—Noise measurements," (2003); Wach; and Hytti, H., "Characterization of digital image noise properties based on RAW data," Proceedings of SPIE—Vol. 6059, Image Quality and System Performance III, Luke C. Cui, Yoichi Miyake, Editors, 60590A Jan. 15, 2006), which assume that a specific pattern or a uniform white plate is used as a target. Previous procedures exploit explicitly such particular nature of the target. However, several practical aspects make such a strategy idealistic. For example, when a uniform white plate is used as the target, the recorded image is never truly uniform because of the unavoidable non-uniformity of illumination and because of the vignetting effect caused by the lens system of the camera in which the sensor is mounted. Consequently, the noise estimation implemented by previous procedures is impaired by inherently biased measurements. Various stratagems and compensations (e.g., "trend subtraction") are typically introduced to counteract these unwanted systematic errors. Nevertheless, an idealistic and unrealizable measurement scenario inevitably hampers the accuracy and trustworthiness of the noise model parameters that can be obtained from previously published procedures.

Averaging:
First, all of the shots N are averaged in order to obtain an approximation of the noise-free y(x)

$$\bar{z}(x) = \frac{1}{N}\sum_{n=1}^{N} z_n(x) = y(x) + \frac{1}{\sqrt{N}}\sigma(y(x))\tilde{\xi}(x). \quad \text{Equation 18}$$

Here, $\tilde{\xi}(x)$ is again some zero-mean noise with a unitary variance. In experiments, up to N=50 shots can be taken, automatically and without touching the imaging device. It means that the pointwise standard deviation in the average observation $\bar{z}$ is about 14% of the one from the individual shots $z_n$.

Segmentation:
The average image $\bar{z}$ is then segmented into a number of non-overlapping uniform intensity regions $\{S\}$, or segments. Ideally, within these regions, the intensity level of $\bar{z}(x)$ should be constant:

$$S(y)=\{x:\bar{z}(x)=y\}. \quad \text{Equation 19}$$

However, this may lead to uncertain results, since there may be too few (or perhaps no) samples (i.e., pixels) that satisfy the equation $\bar{z}(x)=y$. Pragmatically, it is convenient to consider a larger set of the form $$S_\Delta(y)=\{x: \bar{z}(x)\in[y-\Delta/2,y+\Delta/2)\}, \quad \text{Equation 20}$$

where $\Delta>0$ is small.

Measurement of the Intensity-Dependent Standard Deviation:

The standard deviation is then computed independently for each shot as the empirical estimate $$\text{std}_n(y) = \sqrt{\frac{\sum_{m=1}^{M}(z_n(x_m) - \tilde{z}_n(y))^2}{M - 1}}, \quad \text{Equation 21}$$

where $x_m$, m=1, ... M are the coordinates of the pixels that constitute the segment $S_\Delta(y)$, and $\tilde{z}_n(y)$ is the mean value of $z_n$ over $S_\Delta(y)$, $$\tilde{z}_n(y) = \frac{1}{M}\sum_{m=1}^{M} z_n(x_m). \quad \text{Equation 22}$$

The final estimate of the standard deviation as a function of y is given by the average over all N shots $$\hat{\sigma}(y) = \frac{1}{N} \sum_{n=1}^{N} std_n(y). \qquad \text{Equation 23}$$

Model Fitting and Validation:

Using the methodology described above, the standard deviation versus intensity curves have been measured from the sensor's raw data of two exemplary Nokia cameraphones. The average value of the standard deviation is obtained for each of four color channels. In other words, four curves $\hat{\sigma}_R(y)$, $\hat{\sigma}_{G_1}(y)$, $\hat{\sigma}_{G_2}(y)$ and $\hat{\sigma}_B(y)$ have been computed independently, wherein R, $G_1$, $G_2$ and B refer to the four channels of the Bayer-type pattern of the sensor.

It has been found that for $\alpha=1$ (i.e., a gain of 0 dB), the standard deviation function $\alpha^{[1]}$ has the form:

$$\sigma^{[1]}(y) = q\sqrt{y-p} \qquad \text{Equation 24}$$

With the following parameters:

$p_u = 0.0060$, $q_u = 0.050$ $p_v = 0.0092$, $q_v = 0.021$ where indices $p_u$ and $q_u$ refer to the parameters p and q associated with a first cameraphone sensor U, and $p_v$ and $q_v$ refer to the parameters p and q associated with a second cameraphone sensor V having an increased pixel density relative to cameraphone sensor U, a nearly perfect fit of the derived model to the measured data is enabled. This can be seen from the plots illustrated in FIGS. 2A-2D.

Figure 2A:
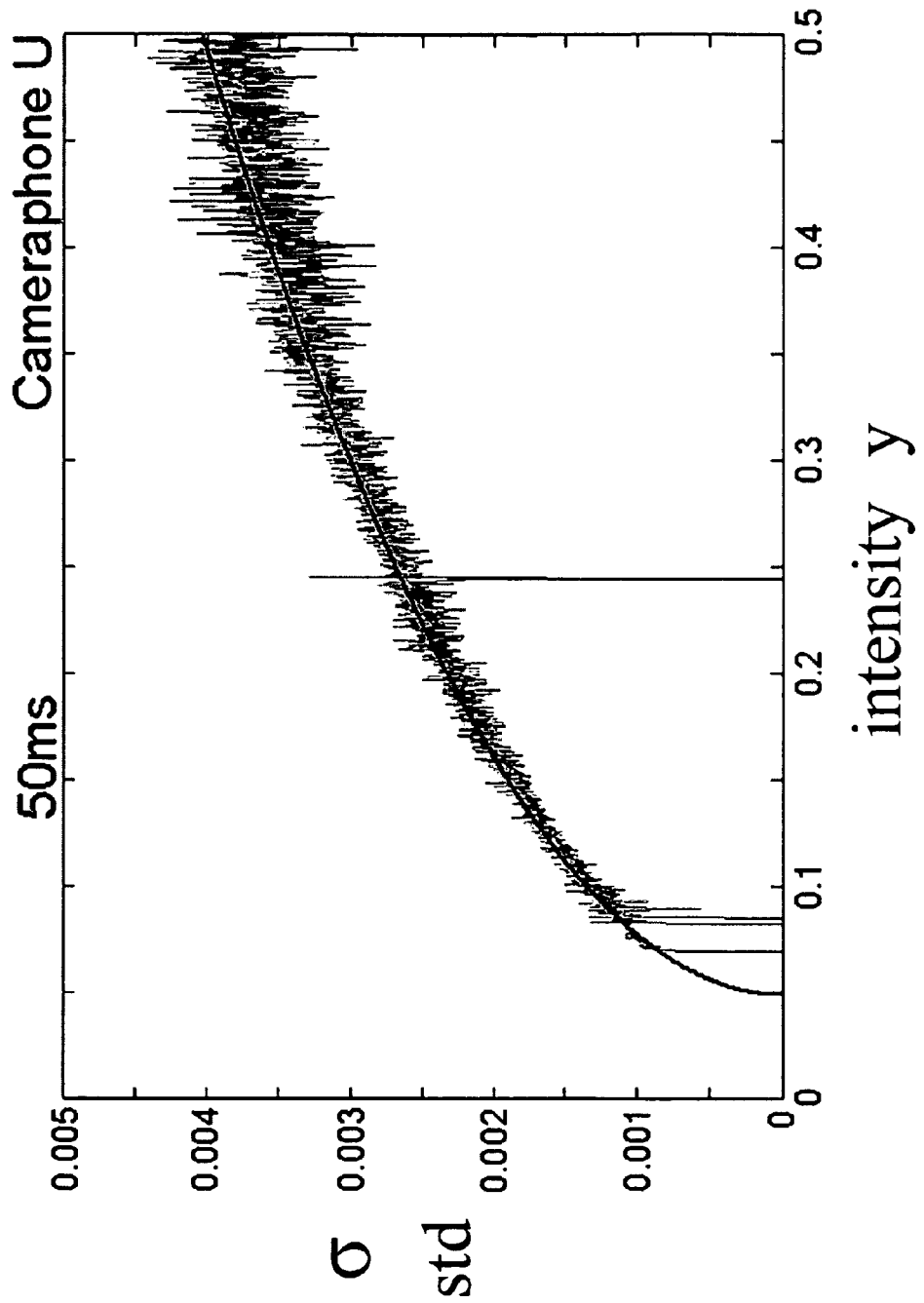
FIGS. 2A and 2B represent the measured standard deviation curves, and corresponding fitted model, based on raw data related to two different CMOS sensors U and V, respectively, in accordance with exemplary embodiments of the present invention.
Figure 2B:
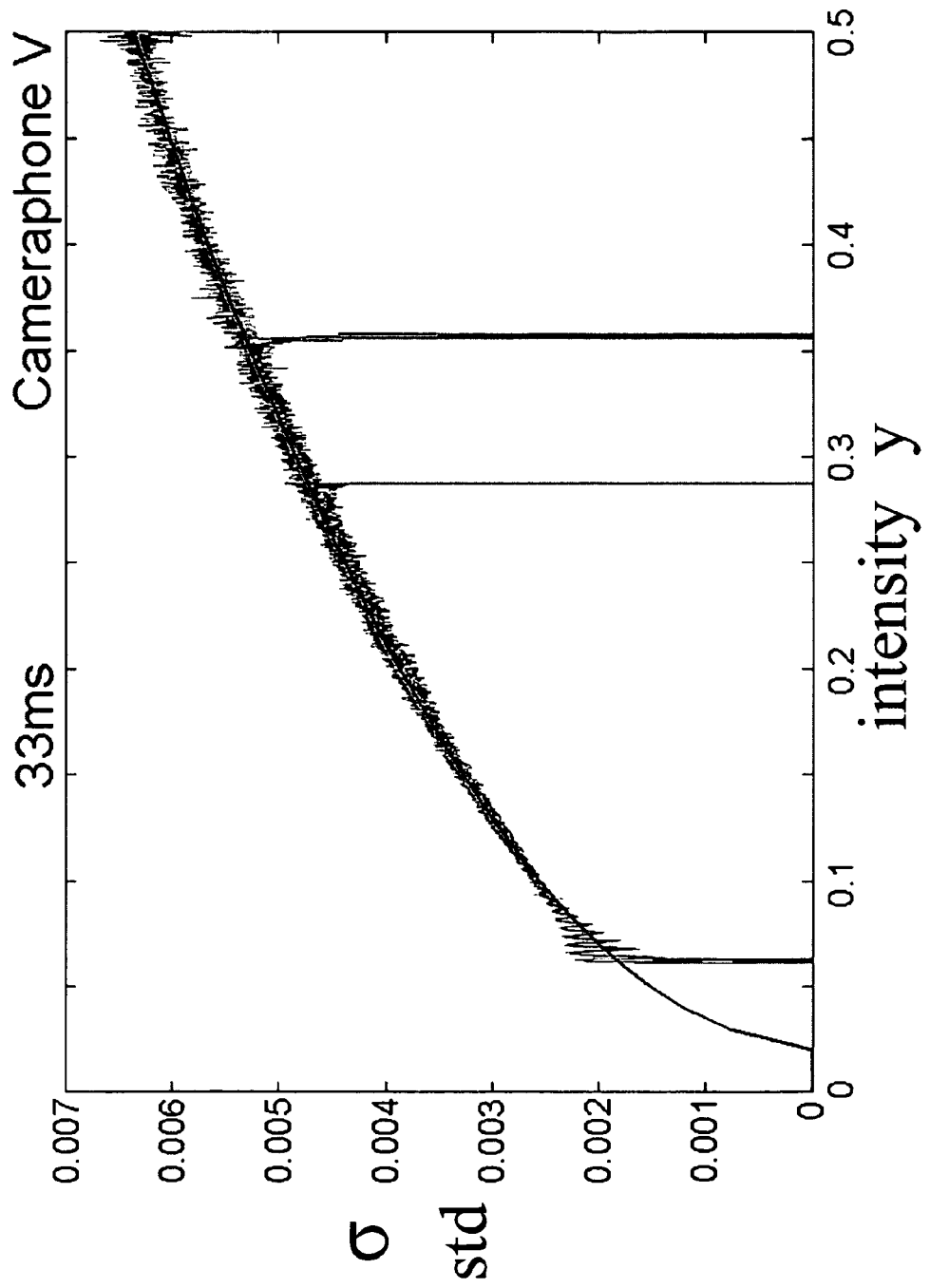

In particular, FIGS. 2A and 2B illustrate the standard deviation curves, and corresponding fitted model, for the raw data of CMOS sensors U and V from two cameraphones, respectively. Each of these figures includes raw data from four separate color channels (R, $G_1$, $G_2$, and B), which are represented by different shades of gray. As can be seen, the noise model of exemplary embodiments fits equally well with the data of all color channels (i.e., the standard deviation versus intensity curve does not depend on the color-channel).

Figure 2C:
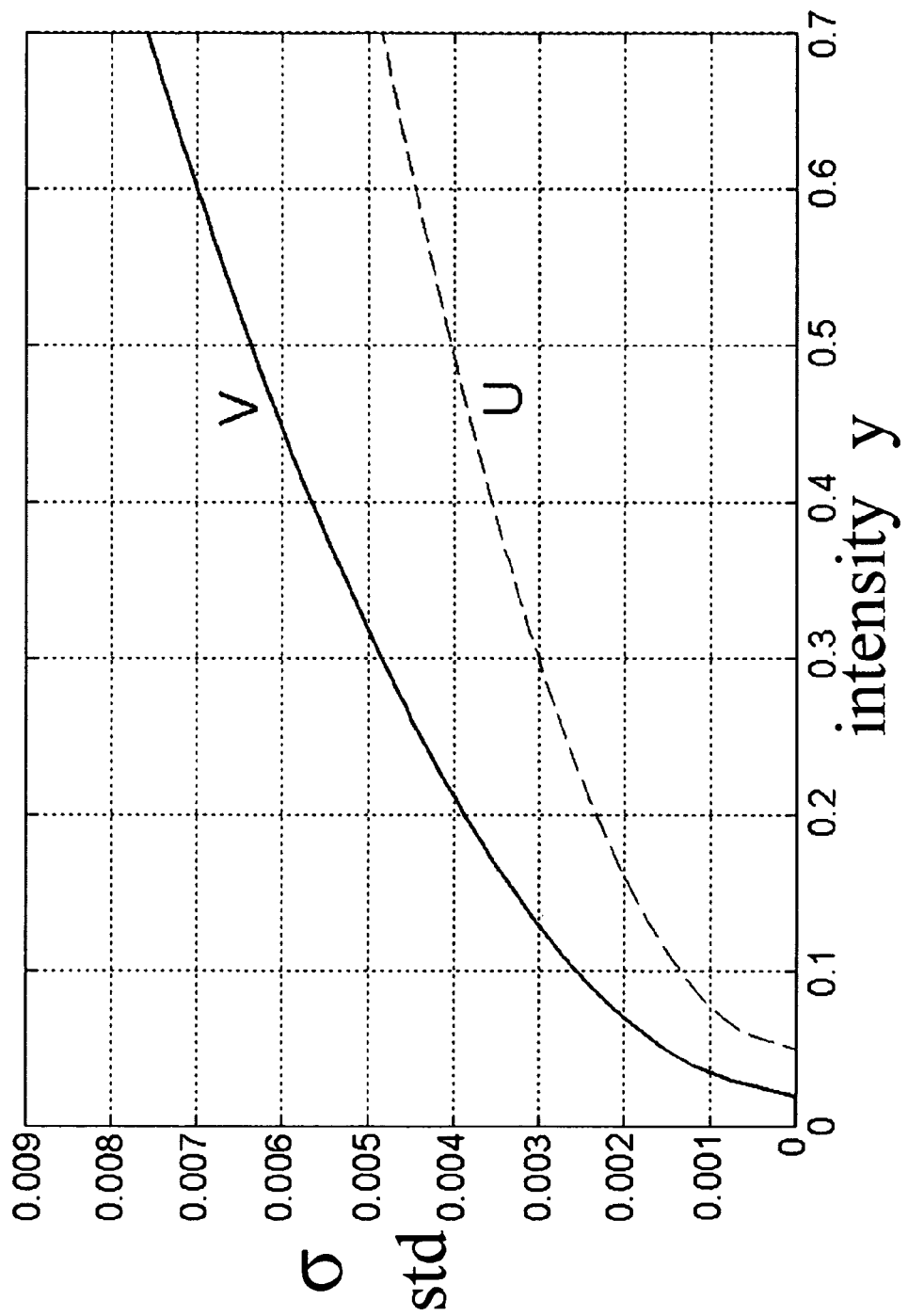
FIG. 2C represents the theoretical standard deviations curves associated with CMOS sensors U and V, respectively, in accordance with exemplary embodiments of the present invention.
Figure 2D:
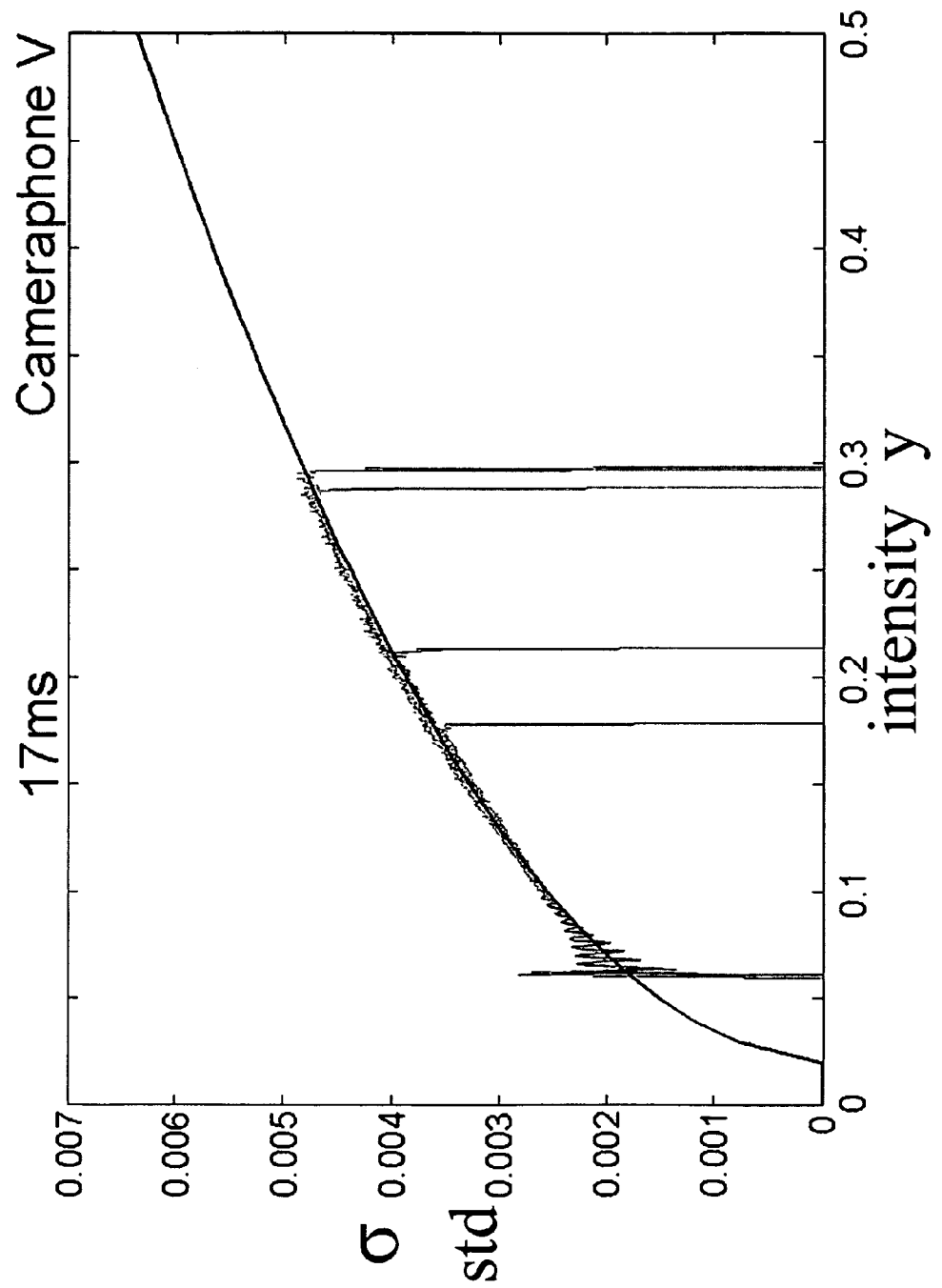
FIG. 2D represents the standard deviation curve, and corresponded fitted model, based on raw data related to CMOS sensor V for a different exposure time, in accordance with exemplary embodiments of the present invention.
Figure 3A:
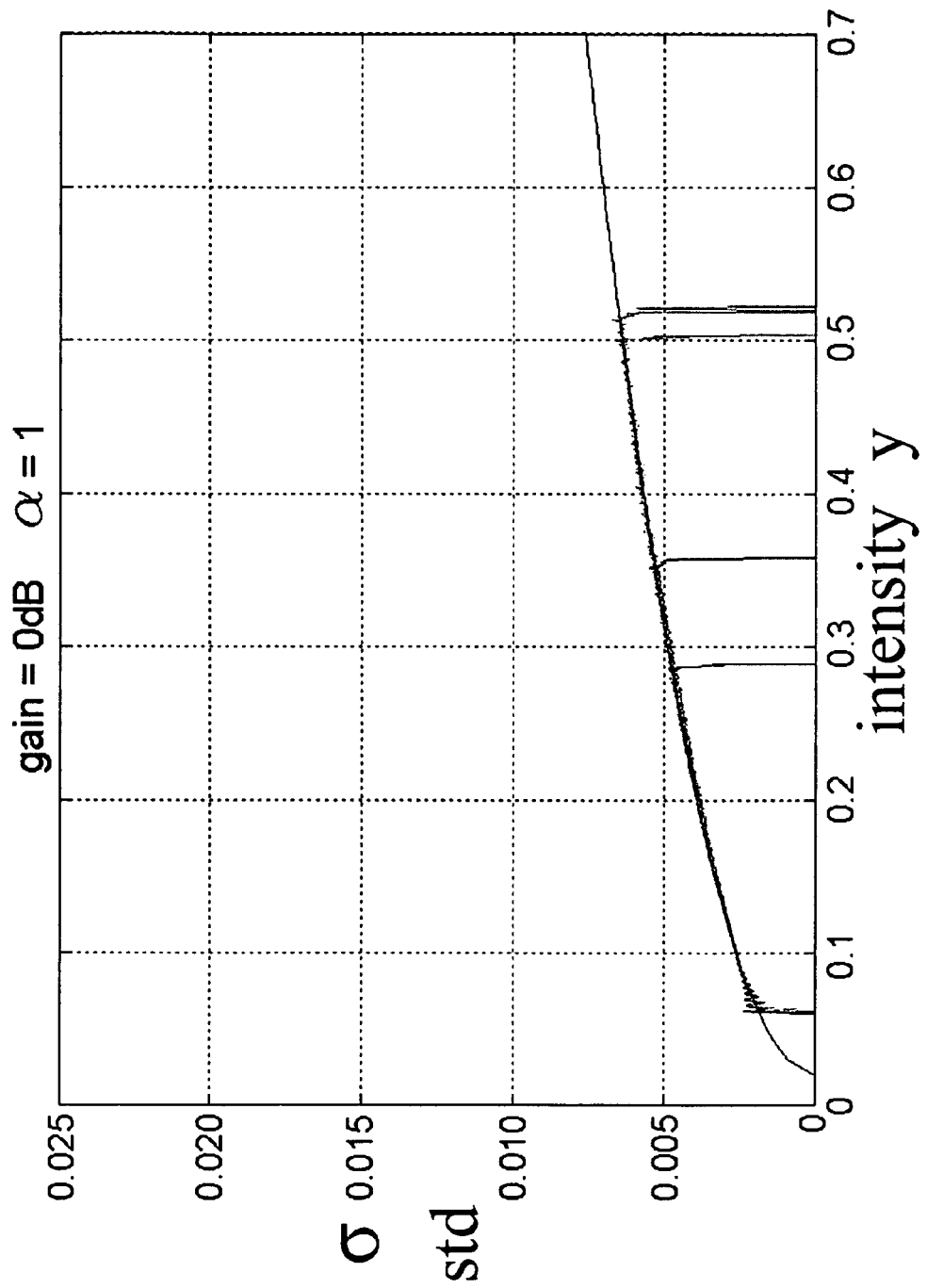
FIGS. 3A-3F represent the measured values for standard deviation as a function of the intensity of the signal, and the corresponding fitted function, for different gain parameters, in accordance with exemplary embodiments of the present invention.
Figure 3B:
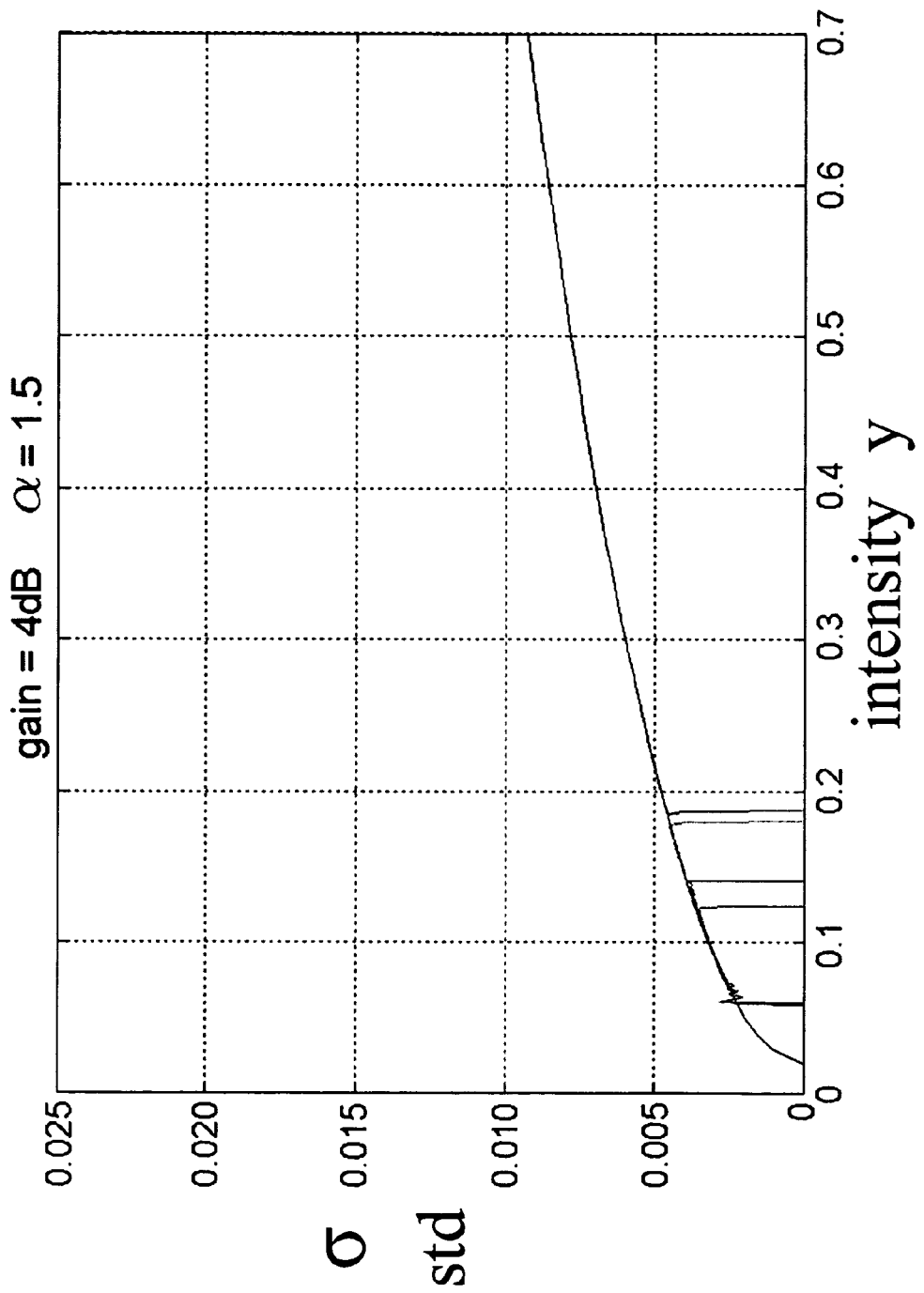
Figure 3C:
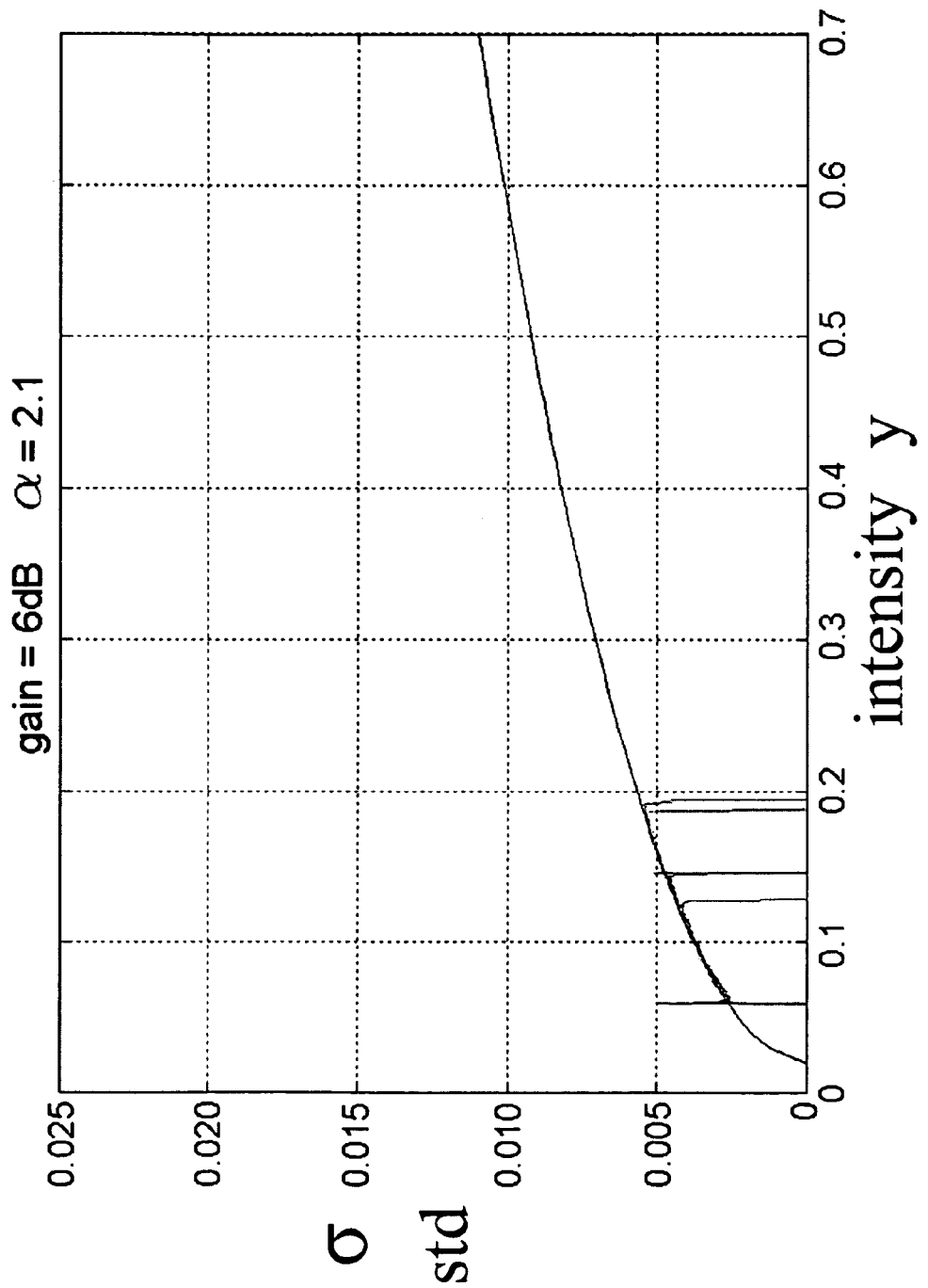
Figure 3D:
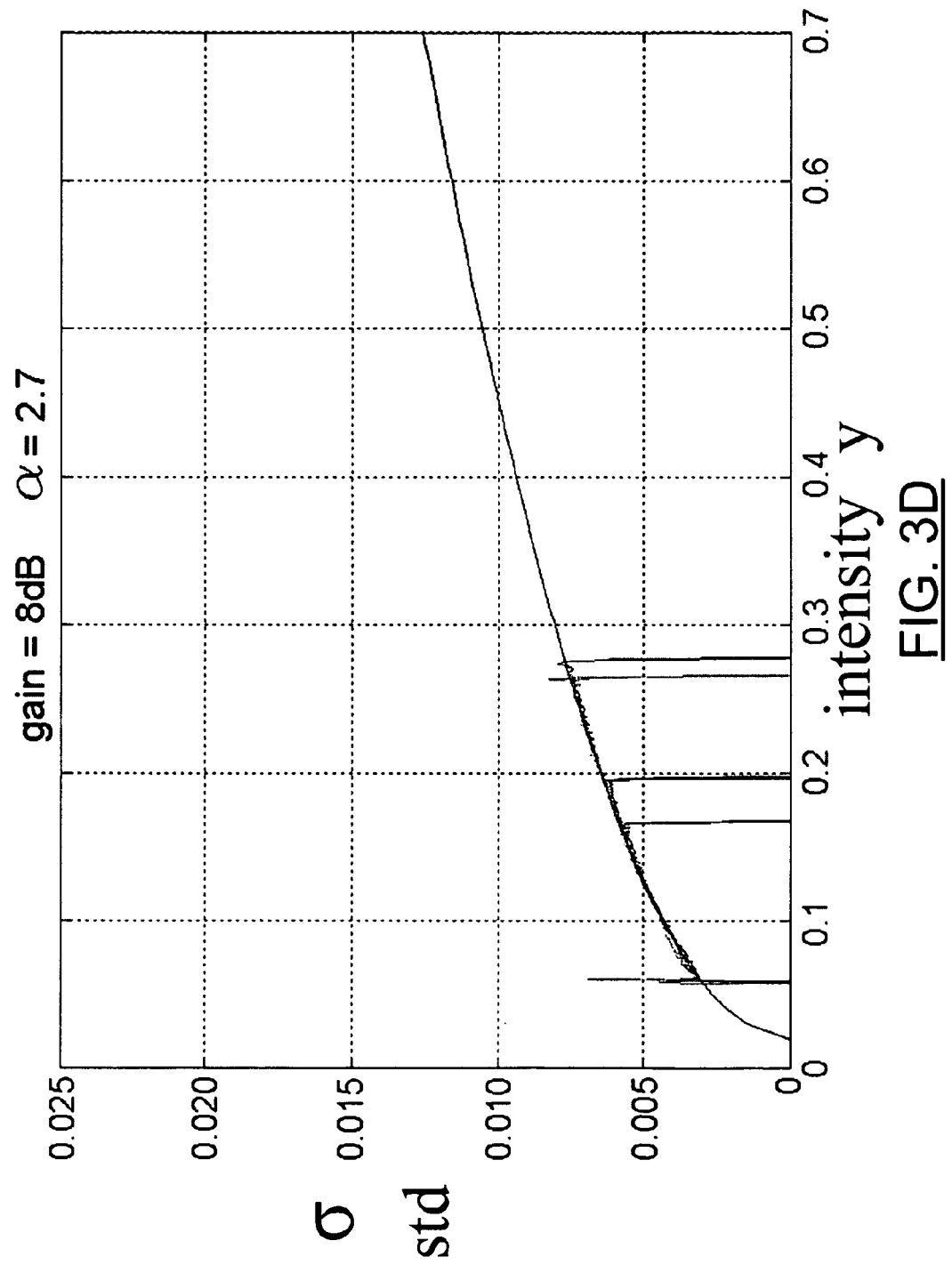
Figure 3E:
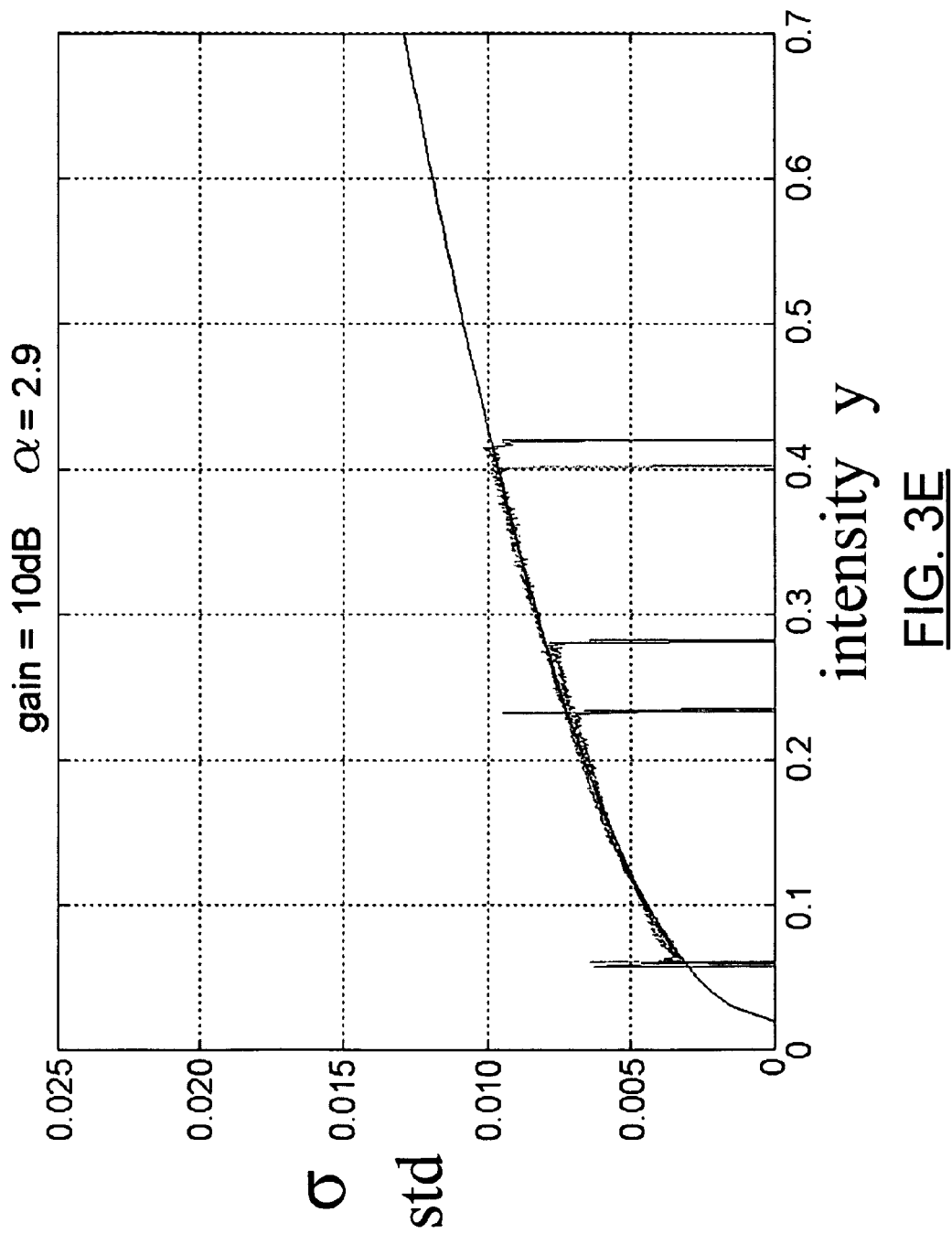
Figure 3F:
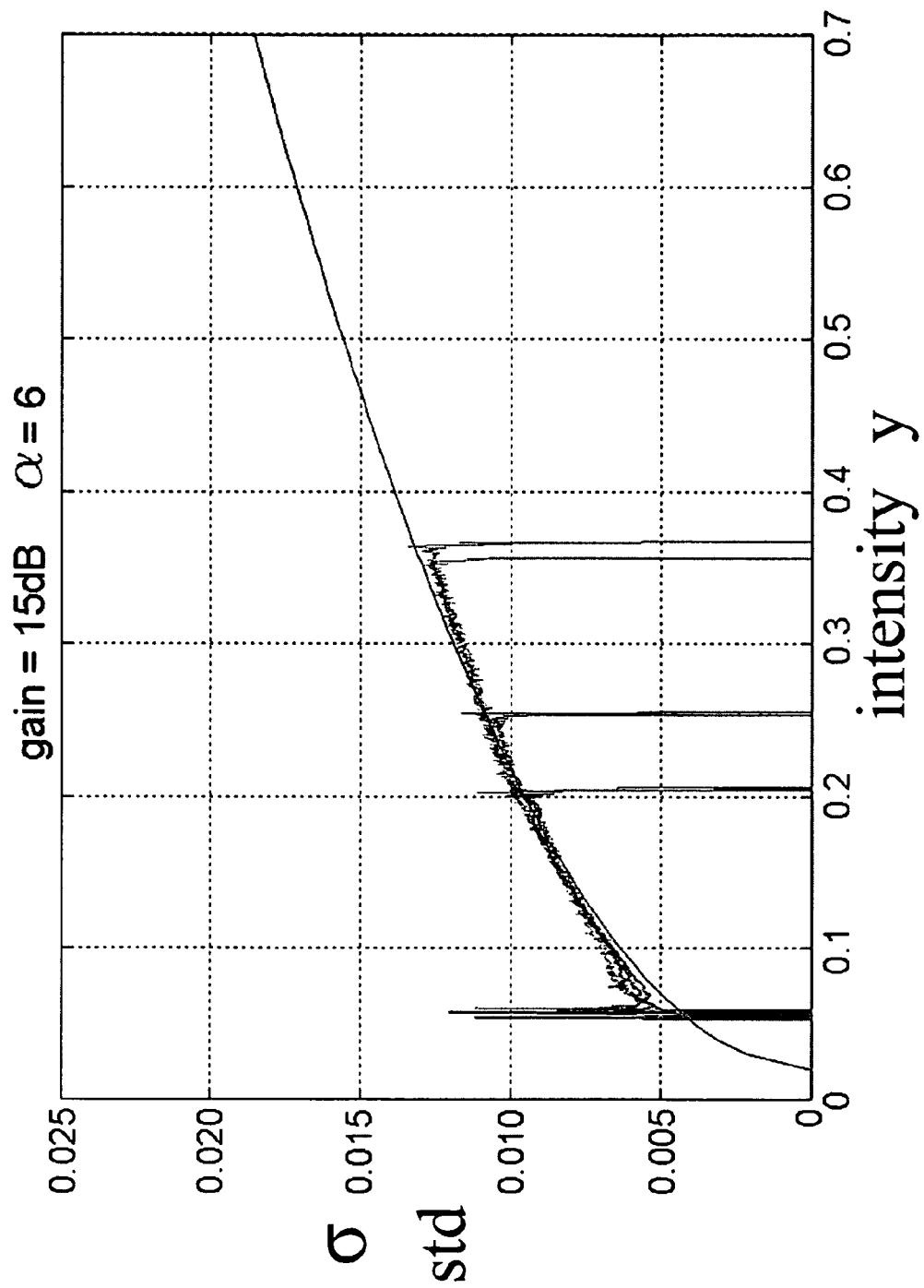

FIG. 2C provides a direct comparison between the standard deviation curves of the two cameraphones, with the dashed line representing the standard deviation curve of U, and the solid line representing the standard deviation curve of V. As shown, cameraphone sensor V, which, as noted above, has an increased pixel density, presents a lower SNR. Finally, FIG. 2D provides the noise model of exemplary embodiments fitted on a standard deviation curve for cameraphone sensor V measured for a different exposure time; thus illustrating that the model further does not depend on exposure time.

As shown in FIGS. 3A-3F, which provide the measured values for the standard deviation as a function of the intensity y, and the corresponding fitted function, the validity of the above-derived noise model can be verified for a number of values of the gain parameter. In particular, FIGS. 3A-3F, respectively, illustrate that the noise model fits the raw data for gains of 0, 4, 6, 8, 10 and 15 dB. The corresponding values of the parameter σ of the model of Equation 17 are, respectively, 1, 1.5, 2.1, 2.7, 2.9 and 6. The derived model fits quite accurately to the data. In fact, with the exception of the last value of the gain, which is rather large, the fit is nearly perfect. In addition, as with FIGS. 2A-2D, the plots of FIGS. 3A-3F include raw data from four separate color channels (shown by data of varying shades of gray), further illustrating that the standard deviation versus intensity curve does not depend on the color channel.

Figure 4:
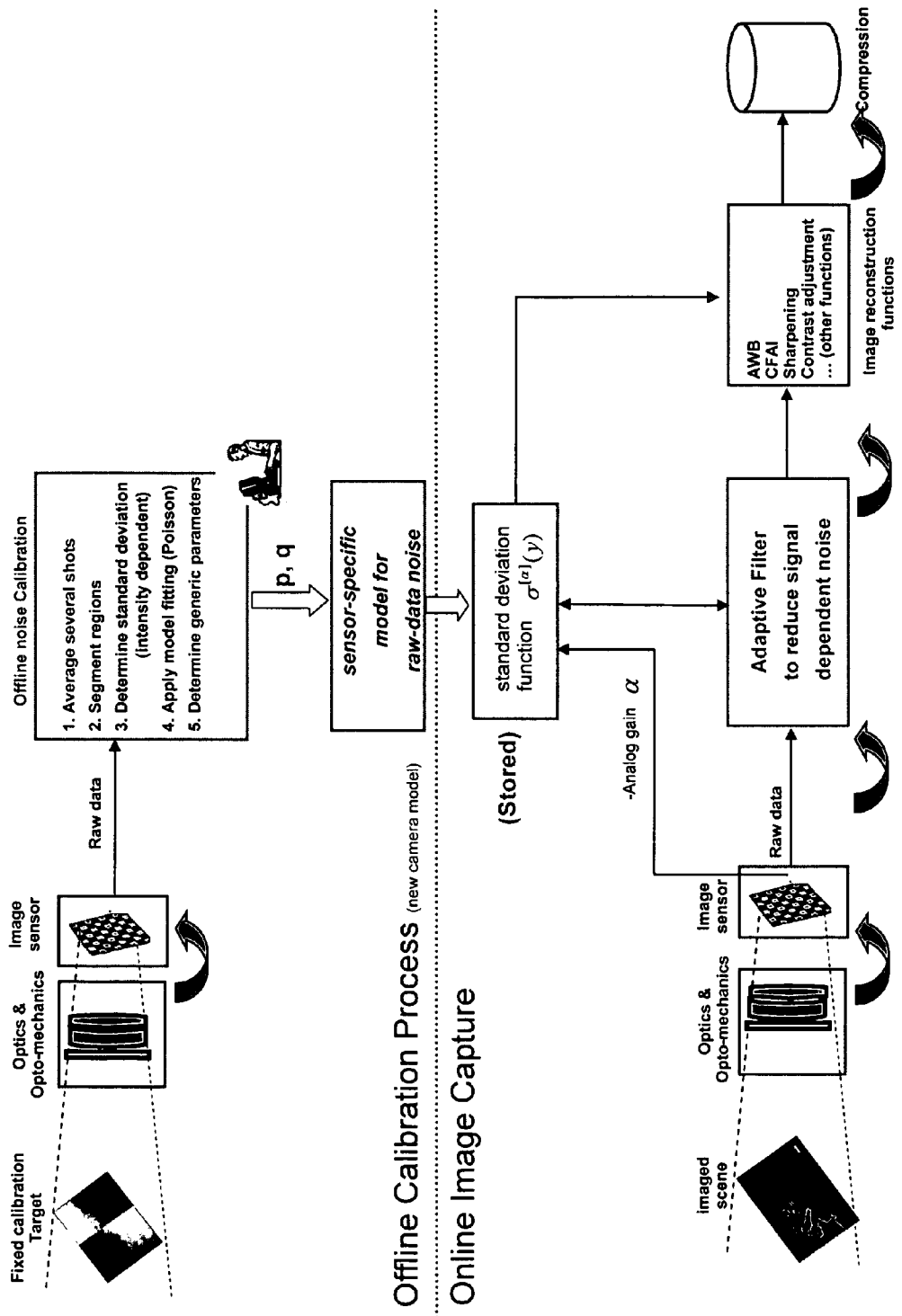
FIG. 4 is a block diagram illustrating the offline calibration and online image capture process of exemplary embodiments of the present invention.

Use of the Signal-Dependent Noise Model in Digital Image Processing:

Referring now to FIG. 4, a block diagram of the above-described calibration process, as well as of the online image capture process, is provided. As shown, and as discussed above, the values of p and q for a particular digital imaging sensor are first determined by: (1) averaging N shots or images of a generic fixed target image; (2) segmenting the average image into a number of uniform intensity regions; (3) computing the standard deviation versus intensity curve (i.e., the standard deviation as a function of the intensity) for each shot to obtain an empirical "per shot" estimate, and computing a final estimate of the standard deviation versus intensity curve by averaging the standard deviations over all N shots; (4) fitting the derived model, which is based on p and q, to the computed standard deviation versus intensity curve in order to (5) determine a specific p and q associated with the digital imaging sensor. Using the determined values of p and q, a sensor-specific signal-dependent noise model (i.e., a calibrated model) can be generated.

According to exemplary embodiments, the calibration process described above is valid and accurate regardless of the particular noise model (e.g., Poissonian), and can, therefore, be used to estimate standard deviation versus intensity curves of radically different noise models. In one exemplary embodiment, one could avoid model fitting altogether by storing the estimated standard deviation versus intensity curves, for example, in a look-up table (LUT), and using the curves directly for de-noising and de-blurring.

In one exemplary embodiment, the calibrated model may be stored in the digital device (e.g., the digital camera, cameraphone, webcam, etc.) for use in filtering the noise from an image captured by the digital imaging sensor.

In particular, as shown in FIG. 4, a processing element, such as an adaptive filter, may receive raw data associated with an image from the digital imaging sensor (i.e., data representing the intensity of the image at respective pixel positions). The processing element then filters the data to remove the noise associated with the signal at each pixel position. More specifically, the processing element uses the data representing the intensity of the image at respective pixel positions, as well as the analogue gain associated with the digital imaging sensor, to determine the standard deviation of the noise associated with respective pixel positions. The adaptive filter can then use the standard deviation to filter the noise from each pixel position. The filtered signal can then be output to an image reconstruction unit, which performs various reconstruction functions including, for example, sharpening the image and/or performing contrast adjustments. According to exemplary embodiments, these subsequent stages may further benefit from the improved noise modeling provided by exemplary embodiments of the present invention.

In general, exemplary embodiments of the present invention provide an improvement over the known prior art since, unlike conventional noise models for de-noising, which use a unique constant σ for every pixel of the image, according to the noise model of exemplary embodiments, σ is a parameterized function, where the parameters are key characteristics of the sensor (p=pedestal level, q=quantum efficiency, and α=analogue gain). In other words, unlike conventional noise models, the general signal-dependent noise model of exemplary embodiments has been reformatted in a form where the parameters of the signal-dependent noise are related to the characteristics of the sensor.

Because the parameters p and q are fixed and depend only on the specific sensor installed in the device, they can be factory-defined and, in some instances, might be reconfigured or recalibrated by the user or service personnel. In addition, the analogue gain (α) parameter for the gain is known, since the sensor automatic parameter selection can provide the chosen gain values to the rest of the imaging chain. Alternatively, the gain parameter can be extrapolated from noise-measurement on the non-exposed portion of the sensor. In one exemplary embodiment, as mentioned above, the specific standard-deviations defined by the model corresponding to these sensor parameters can be placed in a LUT according to the pixelwise intensity, and fetched dynamically by the adaptive filtering procedure (e.g., calculating the exponents in floating point is slower than desired in some software platforms, such as Symbian).

In addition to the foregoing, the noise model of exemplary embodiments provides an improvement over the known prior art because it is specifically targeted at being implemented inside the imaging chain. This is in contrast to being used for hardware implementations where, for example, an analytical engineer desires to know characteristics, such as, the noise of the input current. In particular, as described above, the noise model of exemplary embodiments of the present invention is applied at the first stage of the imaging chain to the digital data that can be processed (i.e., the raw data immediately after the sensor has obtained it).

Figure 5B:
FIGS. 5A and 5B illustrate the improved signal quality that can be achieved using the noise model of exemplary embodiments of the present invention.
Figure 5A:

FIGS. 5A and 5B provide an illustration of the superior quality of the restoration of the image that is obtained by modeling the noise according to Equation 24. In particular, FIG. 5A presents the raw data from a cameraphone's CMOS sensor, R (i.e., red) channel, 1 ms exposure, while FIG. 5B provides the reconstructed image using LPA-ICI (Local Polynomial Approximation-Intersection of Confidence Intervals) adaptive method, which uses the proposed noise model.

Figure 6:
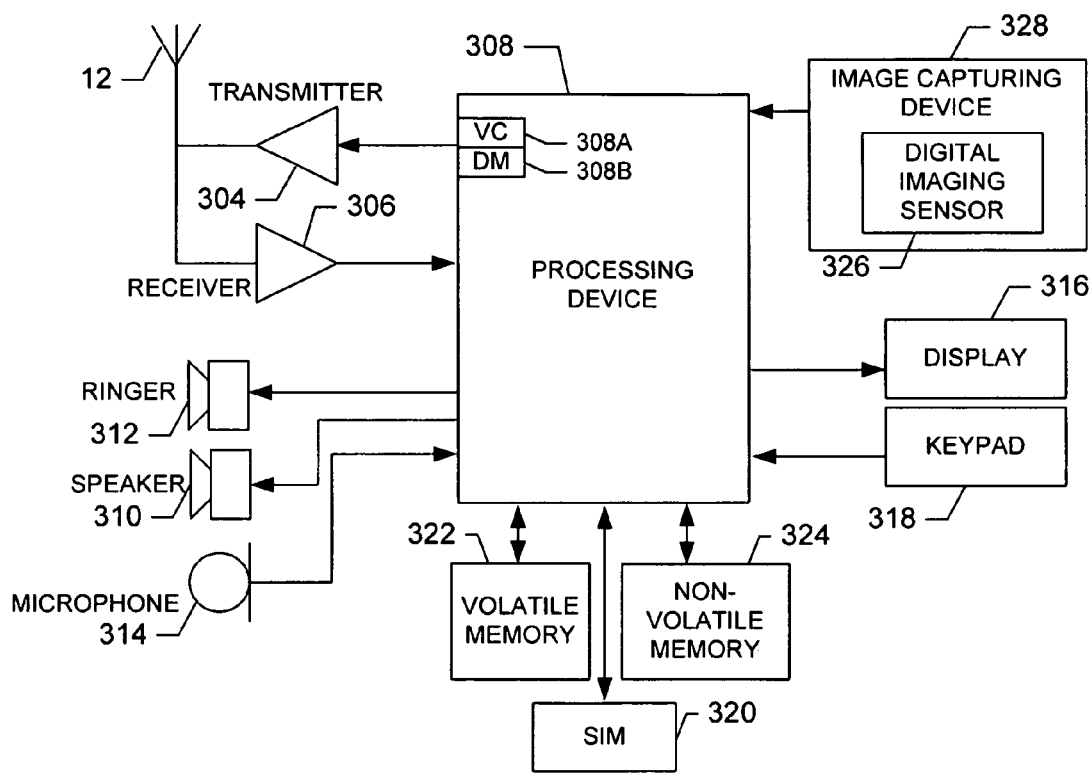
FIG. 6 is a schematic block diagram of a mobile station capable of operating in accordance with an exemplary embodiment of the present invention.

Mobile Station:

Reference is now made to FIG. 6, which illustrates one type of electronic device that would benefit from embodiments of the present invention. As shown, the electronic device may be a mobile station 10, and, in particular, a cellular telephone or cameraphone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as digital cameras, webcams, personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 6, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station 10 may further comprise an image capturing device 328 (e.g., a digital camera, as is known by those of ordinary skill in the art) for capturing digital images for processing in the manner described herein. In particular, the image capturing device 328 of one exemplary embodiment may include components, such as a lens (not shown), a focusing mechanism (also not shown), for automatically or manually focusing the image viewable via the lens, and the like. The image capturing device 328 further includes a digital imaging sensor (e.g., CMOS or CCD sensor) 326, which converts the image into a digital signal. As discussed above, the output of the digital imaging sensor 326 (i.e., the raw data representing the intensity of the image at respective pixel positions) is used to derive the signal-dependent noise model based on one or more parameters associated with characteristics of the digital imaging sensor (e.g., analogue gain, pedestal level and quantum efficiency).

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, in one embodiment of the present invention, the memory may store computer program code for determining the standard deviation of the noise associated with the digital image as a function of the intensity of the signal at respective pixel positions.

The apparatus, method, mobile station and computer program product of exemplary embodiments of the present invention are primarily described in conjunction with mobile communications applications. It should be understood, however, that the apparatus, method, mobile station and computer program product of embodiments of the present invention can be utilized in conjunction with a variety of other applications, both in the mobile communications industries and outside of the mobile communications industries. For example, the apparatus, method, mobile station and computer program product of exemplary embodiments of the present invention can be utilized in conjunction with wireline and/or wireless network (e.g., Internet) applications.

CONCLUSION

As described above and as will be appreciated by one skilled in the art, embodiments of the present invention may be configured as an apparatus, method and mobile station. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   an input for receiving data representative of an intensity of an image at a pixel position;
   a processor for filtering the data to remove noise, wherein the processor filters the data based on at least one parameter associated with one or more characteristics of a sensor through which the image was captured, wherein the processor determines a standard deviation of the noise based on at least one of a quantum efficiency (q), a pedestal level (p), or an analogue gain ($\alpha$) associated with the sensor; and
   an output for providing the filtered data.

2. The apparatus of claim 1, wherein the processor filters the data based on a signal-dependent noise model defined based on the at least one parameter associated with one or more characteristics of the sensor.

3. The apparatus of claim 1, wherein the processor determines the standard deviation of the noise as a function of the intensity of the image at the pixel position.

4. The apparatus of claim 3, wherein the processor determines the standard deviation of the noise in accordance with $\sigma^{[\alpha]}(y)=q\sqrt{\alpha(y-p)}$, wherein y represents the intensity of the image at the pixel position.

5. The apparatus of claim 3, wherein the standard deviation of the noise is independent of a color-channel and an exposure time associated with the data.

6. The apparatus of claim 1, wherein the input receives the data directly from the sensor.

7. The apparatus of claim 1, wherein the output provides the filtered data to an image reconstruction unit.

8. The apparatus of claim 1, wherein the processor calibrates the sensor using a generic fixed target image.

9. The apparatus of claim 8, wherein the processor calibrates the sensor by:
capturing a plurality of images of the generic fixed target image;
averaging the intensities associated with the plurality of images captured;
segmenting the average intensity into a plurality of non-overlapping intensity regions, wherein the regions are defined irrespective of a shape or structure associated with the generic fixed target image;
computing a standard deviation for respective images as a function of the intensities associated with the image;
averaging the standard deviations computed;
determining at least one parameter associated with one or more characteristics of the sensor based at least in part on the average standard deviation; and
generating a sensor-specific signal-dependent noise model based at least in part on the at least one parameter.

10. A method comprising:
receiving data representative of an intensity of an image at a pixel position;
filtering the data to remove noise using a processor, wherein filtering the data comprises filtering the data based on at least one parameter associated with one or more characteristics of a sensor through which the image was captured;
determining a standard deviation of the noise based on at least one of a quantum efficiency (q), a pedestal level (p), or an analogue gain ($\alpha$) associated with the sensor; and
providing the filtered data.

11. The method of claim 10, wherein filtering the data comprises filtering the data based on a signal-dependent noise model defined based on the at least one parameter associated with one or more characteristics of the sensor.

12. The method of claim 10 further comprising:
determining the standard deviation of the noise as a function of the intensity of the image at the pixel position.

13. The method of claim 12, wherein determining the standard deviation of the noise comprises determining the standard deviation of the noise in accordance with $\sigma^{[\alpha]}(y)=q\sqrt{\alpha(y-p)}$, wherein y represents the intensity of the image at the pixel position.

14. The method of claim 12, wherein the standard deviation of the noise is independent of a color-channel and an exposure time associated with the data.

15. The method of claim 10, wherein receiving data representative of an intensity of an image at a pixel position comprises receiving the data directly from the sensor.

16. The method of claim 10, wherein providing the filtered data comprises providing the filtered data to an image reconstruction unit.

17. The method of claim 10 further comprising:
calibrating the sensor using a generic fixed target image.

18. The method of claim 17, wherein calibrating the sensor further comprises:
capturing a plurality of images of the generic fixed target image;
averaging the intensities associated with the plurality of images captured;
segmenting the average intensity into a plurality of non-overlapping intensity regions, wherein the regions are defined irrespective of a shape or structure associated with the generic fixed target image;
computing a standard deviation for respective images as a function of the intensities associated with the image;
averaging the standard deviations computed;
determining at least one parameter associated with one or more characteristics of the sensor based at least in part on the average standard deviation; and
generating a sensor-specific signal-dependent noise model based at least in part on the at least one parameter.

19. An apparatus comprising:
at least one processor; and
at least one memory including computer program code, the at least one memory and the computer program code configured to, with the at least one processor, cause an apparatus to perform at least the following:
receive data representative of an intensity of an image at a pixel position;
filter the data to remove noise, wherein the at least one memory and the computer program code are further configured to, with the at least one processor, cause an apparatus, to filter the data based on at least one parameter associated with one or more characteristics of a sensor through which the image was captured;
determine a standard deviation of the noise based on at least one of a quantum efficiency (g), a pedestal level (v), or an analogue gain ($\alpha$) associated with the sensor; and
provide the filtered data.

20. The apparatus of claim 19, wherein, in order to filter the data to remove noise, the at least one memory and the computer program code are further configured to with the at least one processor, cause an apparatus to filter the data based on a signal-dependent noise model defined based on the at least one parameter associated with one or more characteristics of the sensor.

21. The apparatus of claim 19, wherein the at least one memory and the computer program code are further configured to with the at least one processor, cause an apparatus to:
determine the standard deviation of the noise as a function of the intensity of the image at the pixel position.

22. The apparatus of claim 21, wherein, in order to determine the standard deviation of the noise, the at least one memory and the computer program code are further configured to with the at least one processor, cause an apparatus to determine the standard deviation of the noise in accordance with $\sigma^{[\alpha]}(y)=q\sqrt{\alpha(y-p)}$, wherein y represents the intensity of the image at the pixel position.

23. The apparatus of claim 21, wherein the standard deviation of the noise is independent of a color-channel and an exposure time associated with the data.

24. The apparatus of claim 19 further comprising:
a digital imaging sensor configured to provide the data representative of an intensity of an image at a pixel position.

25. The apparatus of claim 19 further comprising:
an image reconstruction unit configured to receive the filtered data and to perform one or more reconstruction functions on the filtered data.

26. The apparatus of claim 19, wherein the at least one memory and the computer program code are fun her configured to with the at least one processor, cause an apparatus to:
   calibrate the sensor using a generic fixed target image.

27. The apparatus of claim 26, wherein, in order to calibrate the sensor, the at least one memory and the computer program code are further configured to with the at least one processor, cause an apparatus to:
   capture a plurality of images of the generic fixed target image;
   average the intensities associated with the plurality of images captured;
   segment the average intensity into a plurality of non-overlapping intensity regions, wherein the regions are defined irrespective of a shape or structure associated with the generic fixed target image;
   compute a standard deviation for respective images as a function of the intensities associated with the image;
   average the standard deviations computed;
   determine at least one parameter associated with one or more characteristics of the sensor based at least in part on the average standard deviation; and
   generate a sensor-specific signal-dependent noise model based at least in part on the at least one parameter.

28. An apparatus comprising:
   means for receiving data representative of an intensity of an image at a pixel position;
   means for filtering the data to remove noise, wherein filtering the data comprises filtering the data based on at least one parameter associated with one or more characteristics of a sensor through which the image was captured;
   means for determining a standard deviation of the noise based on at least one of a quantum efficiency (q), a pedestal level (p), or an analogue gain (α) associated with the sensor; and
   means for providing the filtered data.

29. The apparatus of claim 28, wherein the means for filtering the data to remove noise further comprises means for filtering the data based on a signal-dependent noise model defined based on the at least one parameter associated with one or more characteristics of the sensor.

30. The apparatus of claim 28 further comprising:
   means for determining the standard deviation of the noise as a function of the intensity of the image at the pixel position.

31. The apparatus of claim 30 wherein the means for determining the standard deviation of the noise based on at least one of a quantum efficiency (q), a pedestal level (p), or an analogue gain (α) associated with the sensor further comprises means for determining the standard deviation of the noise in accordance with $\sigma^{[\alpha]}(y) = \sqrt{\alpha(y-p)}$, wherein y represents the intensity of the image at the pixel position.

32. The apparatus of claim 30, wherein the standard deviation of the noise is independent of a color-channel and an exposure time associated with the data.

33. The apparatus of claim 28, wherein the means for receiving the data representative of an intensity of an image at a pixel position comprises means for receiving the data directly from the sensor.

34. The apparatus of claim 28, wherein the means for providing the filtered data comprises means for providing the filtered data to an image reconstruction unit.

35. The apparatus of claim 28 further comprising:
   means for calibrating the sensor using a generic fixed target image.

36. The apparatus of claim 35, wherein the means for calibrating the sensor further comprises:
   means for capturing a plurality of images of the generic fixed target image;
   means for averaging the intensities associated with the plurality of images captured;
   means for segmenting the average intensity into a plurality of non-overlapping intensity regions, wherein the regions are defined irrespective of a shape or structure associated with the generic fixed target image;
   means for computing a standard deviation for respective images as a function of the intensities associated with the image;
   means for averaging the standard deviations computed;
   means for determining at least one parameter associated with one or more characteristics of the sensor based at least in part on the average standard deviation; and
   means for generating a sensor-specific signal-dependent noise model based at least in part on the at least one parameter.

37. A computer program product comprising at least one computer-readable storage medium having computer-readable program code portions stored therein, the computer-readable program code portions comprising:
   a first executable portion for receiving data representative of an intensity of an image at a pixel position;
   a second executable portion for filtering the data to remove noise, wherein the second executable portion is configured to filter the data based on at least one parameter associated with one or more characteristics of a sensor through which the image was captured;
   a third executable portion for determining a standard deviation of the noise based on at least one of a quantum efficiency (q), a pedestal level (p), or an analogue gain (α) associated with the sensor; and
   a fourth executable portion for providing the filtered data.

38. The computer program product of claim 37, wherein the second executable portion is configured to filter the data based on a signal-dependent noise model defined based on the at least one parameter associated with one or more characteristics of the sensor.

39. The computer program product of claim 37, wherein the computer-readable program code portions further comprise:
   a fifth executable portion for determining the standard deviation of the noise as a function of the intensity of the image at the pixel position.

40. The computer program product of claim 39, wherein the fifth executable portion is further configured to determine the standard deviation of the noise in accordance with $\sigma^{[\alpha]}(y) q\sqrt{\alpha(y-p)}$, wherein y represents the intensity of the image at the pixel position.

41. The computer program product of claim 39, wherein the standard deviation of the noise is independent of a color-channel and an exposure time associated with the data.

42. The computer program product of claim 34, wherein the first executable portion is configured to receive the data representative of an intensity of an image at a pixel position directly from the sensor.

43. The computer program product of claim 34, wherein the fourth executable portion is configured to provide the filtered data to an image reconstruction unit.

44. The computer program product of claim 34, wherein the computer-readable portions further comprise:
   a fifth executable portion for calibrating the sensor using a generic fixed target image.

45. The computer program product of claim 44, wherein the fifth executable portion further comprises:

a sixth executable portion for capturing a plurality of images of the generic fixed target image;

a seventh executable portion for averaging the intensities associated with the plurality of images captured;

an eighth executable portion for segmenting the average intensity into a plurality of non-overlapping intensity regions, wherein the regions are defined irrespective of a shape or structure associated with the generic fixed target image;

a ninth executable portion for computing a standard deviation for respective images as a function of the intensities associated with the image;

a tenth executable portion for averaging the standard deviations computed;

an eleventh executable portion for determining at least one parameter associated with one or more characteristics of the sensor based at least in part on the average standard deviation; and a twelfth executable portion for generating a sensor-specific signal-dependent noise model based at least in part on the at least one parameter.

\* \* \* \* \*

UNITED STATES PATENT AND TRADEMARK OFFICE
CERTIFICATE OF CORRECTION

PATENT NO. : 7,652,788 B2
APPLICATION NO. : 11/519722
DATED : January 26, 2010
INVENTOR(S) : Foi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,652,788 B2 | Page 1 of 1 |
| APPLICATION NO. | : 11/519722 | |
| DATED | : January 26, 2010 | |
| INVENTOR(S) | : Foi et al. | |

It is certified that error appears in the above-identified patent and that said Letters Patent is hereby corrected as shown below:

Column 17,

Line 2, "fun her" should read --further--.

Signed and Sealed this
Twenty-first Day of June, 2011

David J. Kappos
*Director of the United States Patent and Trademark Office*